(12) United States Patent
Vuong (10) Patent No.: US 7,849,143 B2
(45) Date of Patent: Dec. 7, 2010

(54) SYSTEM AND METHOD OF DYNAMIC MANAGEMENT OF SPAM

(75) Inventor: Thanh Vuong, Waterloo (CA)

(73) Assignee: Research in Motion Limited, Waterloo, Ontario (*) Notice: Subject to any disclaimer, the term of this patent is extended or adjusted under 35 U.S.C. 154(b) by 778 days.

(21) Appl. No.: 11/319,407

(22) Filed: Dec. 29, 2005

(65) Prior Publication Data

US 2007/0156895 A1 Jul. 5, 2007

(51) Int. Cl.
G06F 15/16 (2006.01)
(52) U.S. Cl. ............... 709/206; 709/201; 709/207; 709/225; 709/232
(58) Field of Classification Search ............ 709/201, 709/206, 207, 225, 232
See application file for complete search history.

(56) References Cited

U.S. PATENT DOCUMENTS

| | | | | |
|---|---|---|---|---|
| 7,206,814 B2* | 4/2007 | Kirsch | ............ | 709/206 |
| 7,359,941 B2* | 4/2008 | Doan et al. | ............ | 709/205 |
| 7,366,761 B2* | 4/2008 | Murray et al. | ............ | 709/206 |
| 7,406,502 B1* | 7/2008 | Oliver et al. | ............ | 709/206 |
| 7,543,053 B2* | 6/2009 | Goodman et al. | ............ | 709/206 |
| 7,562,122 B2* | 7/2009 | Oliver et al. | ............ | 709/224 |
| 7,657,599 B2* | 2/2010 | Smith | ............ | 709/206 |
| 2003/0023692 A1* | 1/2003 | Moroo | ............ | 709/206 |
| 2005/0015626 A1* | 1/2005 | Chasin | ............ | 713/201 |
| 2006/0104211 A1* | 5/2006 | Islam et al. | ............ | 370/252 |
| 2006/0206713 A1* | 9/2006 | Hickman et al. | ............ | 713/176 |
| 2008/0104187 A1* | 5/2008 | Wilson et al. | ............ | 709/206 |

FOREIGN PATENT DOCUMENTS

| EP | 1 509 014 A2 | 2/2005 |
|---|---|---|
| WO | WO 99/32985 | 7/1999 |
| WO | WO 01/38999 | 5/2001 |

OTHER PUBLICATIONS

U.S. Appl. No. 10/869,530, filed Nov. 24, 2005, Haviv et al.
Baracuda Frequently Asked Questions, HTTP://WWW.ESRL.LIB.MD.US/BARRACUDA_FAQ.PDF, Last Modified Feb. 25, 2004, 11 Pages.

* cited by examiner

*Primary Examiner*—Rupal D Dharia
*Assistant Examiner*—Van Kim T Nguyen
(74) *Attorney, Agent, or Firm*—Hanley, Flight & Zimmerman, LLC.

(57) ABSTRACT

There is disclosed a system and method of dynamically managing spam directed to a communications device. In an embodiment, a contact for each incoming message item is compared to contacts on a whitelist. If the contact is not found on the whitelist, the contact is added to a blacklist based on predetermined criteria. At a selected time, a summary of each message item corresponding to a contact on the blacklist is made available to the communications device. Based on this summary, a user selects contacts to transfer from the blacklist to the whitelist. The user selection is received, and any message items corresponding to a contact on the whitelist are transmitted to the communications device.

15 Claims, 7 Drawing Sheets

```
                    mon, nov 14
                     12:33 pm

--- Mon, Nov 14 ---
601    ✉  12:28p    Robert      Re: Today's Meeting
604    ✉  09:30a    Brenda      Re: Lunch plans
607    ✉  08:13a    Fred        Re: Today's Meeting
```

FIG. 8A — 800A

```
                    mon, nov 14
                     4:00 pm

--- Mon, Nov 14 ---
         Summary of Blacklist Items - Select to move to Whitelist
801   ☐  11:16a    Spammer A    Re: Make easy money
802   ☐  10:02a    Spammer B    Re: Update your banking info...
803   ☐  09:22a    Spammer C    Re: Discount vitamins for sale
804   ☒  09:03a    New Contact A  Re: Thank You
```

```
                    mon, nov 14
                     4:02 pm

--- Mon, Nov 14 ---
1001 →  ✉  02:45p   Edith         Re: Meeting reminder
1002 →  ✉  02:33p   Brenda        Re: Thanks for lunch
 601 →  ✉  12:28p   Robert        Re: Today's Meeting
 604 →  ✉  09:30a   Brenda        Re: Lunch plans
1003 →  ✉  09:03a   New Contact A Re: Thank You
 607 →  ✉  08:13a   Fred          Re: Today's Meeting
```

FIG. 10  ← 1000

SYSTEM AND METHOD OF DYNAMIC MANAGEMENT OF SPAM

FIELD OF THE INVENTION

The present invention relates generally to the field of wireless data communications systems, and more specifically to the management of spam messages.

BACKGROUND

Even with the introduction and widespread use of various techniques for filtering spam, spam continues to be a significant problem for many email users. While a wide range of settings for filtering can be used, if the filtering criteria used are too strict, too many legitimate email messages may be caught in the filter, making the filter practically unusable. Alternatively, if the filtering criteria are too permissive, too many spam messages may get through the filter, again rendering the filter ineffective. Finding the right balance has been difficult.

Spam is undesirable for many reasons. Spam messages may be carriers of viruses (e.g. worms, Trojan horses, etc.) that may damage application software or the operating system, reduce system performance, or compromise user privacy by surreptitiously capturing personal information or tracking and reporting usage habits. As well, in certain operating environments, such as a wireless communications network, spam messages forwarded to a mobile communications device may incur significant network usage charges (e.g. based on bandwidth usage, elapsed time, or message count), or roaming charges (i.e. when the communications device is being used on a wireless network other than that of the local service provider).

Thus, what is needed is a more effective system and method of managing spam, especially in a wireless operating environment.

BRIEF DESCRIPTION OF THE DRAWINGS

In the figures which illustrate exemplary embodiments of the invention.

DETAILED DESCRIPTION

As noted above, the present invention relates to a system and method for dynamically managing spam. The invention is also well suited for mobile communications devices in a wireless operating environment.

Figure 1:
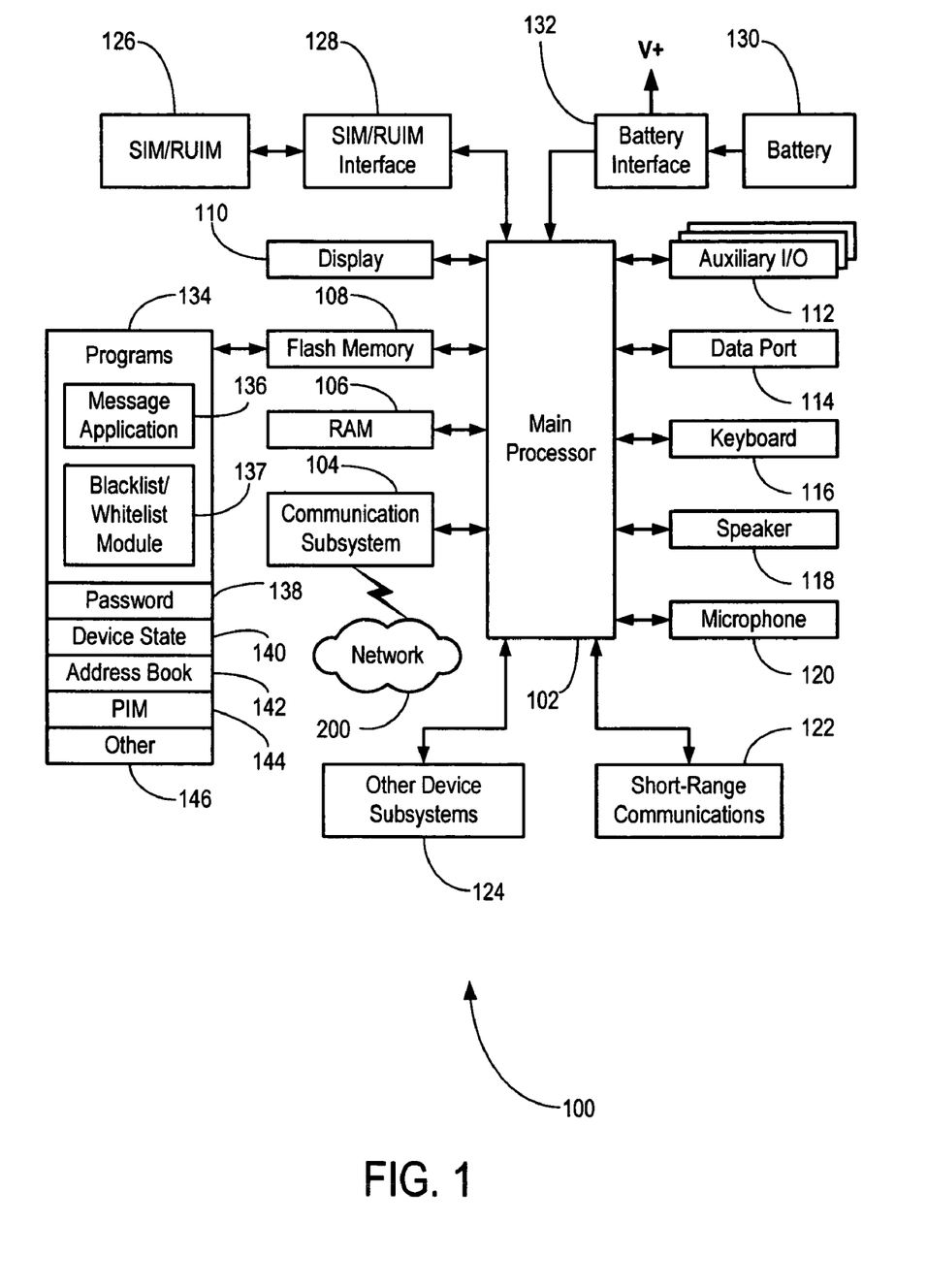
FIG. 1 is a schematic block diagram of an illustrative mobile communications device.

Shown in FIG. 1 is a schematic block diagram of illustrative mobile communications device 100. The communications device 100 may comprise a number of components, including a main processor 102 which controls the overall operation of communications device 100. Communication functions, including data and voice communications, may be performed through a communication subsystem 104. The communication subsystem 104 may receive messages from and sends messages to a wireless network 200. In this illustrative embodiment of the communications device 100, the communication subsystem 104 may be configured in accordance with the Global System for Mobile Communication (GSM) and General Packet Radio Services (GPRS) standards. Presently, the GSM/GPRS wireless network is widely used, although it is expected that these standards will be superseded eventually by Enhanced Data GSM Environment (EDGE) and Universal Mobile Telecommunications Service (UMTS). Other standards are still being defined, but it is believed that they will have similarities to the network behaviour described herein, and it will also be understood by persons skilled in the art that the embodiments described herein are intended to use any other suitable standards that may be developed in the future.

In the illustrative example in FIG. 1, the wireless link connecting the communication subsystem 104 with the wireless network 200 represents one or more different Radio Frequency (RF) channels, operating according to defined protocols specified for GSM/GPRS communications. With newer network protocols, these channels may be capable of supporting both circuit switched voice communications and packet switched data communications.

In alternative implementations, other wireless networks may be associated with the communications device 100. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 may also interact with additional subsystems such as a random access memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the communications device 100 may perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list. Operating system software used by the main processor 102 is typically stored in a persistent store such as the flash memory 108, which may alternatively be a read-only memory (ROM) or similar storage element (not shown). Those skilled in the art will appreciate that the operating system, specific device applications, or parts thereof, may be temporarily loaded into a volatile store such as the RAM 106.

The communications device 100 may send and receive communication signals over the wireless network 200 after required network registration or activation procedures have been completed. Network access may be associated with a subscriber or user of the communications device 100. To identify a user, the communications device 100 may require a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a user of the communications device 100 and to personalize the communications device 100, among other things. Without the SIM card 126, the communications device 100 is not fully operational for communication with the wireless network 200. By inserting the SIM card/RUIM 126 into the SIM/RUIM interface 128, a user can access all subscribed services. Services may include: web browsing and messaging such as email, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the user, the SIM card/RUIM 126 contains some user parameters such as an International Mobile Subscriber Identity (IMSI). An advantage of using the SIM card/RUIM 126 is that a user is not necessarily bound by any single physical communications device. The SIM card/RUIM 126 may store additional user information for a communications device as well, including datebook (or calendar) information and recent call information. Alternatively, user identification information can also be programmed into the flash memory 108.

The communications device 100 may be a battery-powered device and may include a battery interface 132 for receiving one or more rechargeable batteries 130. In some embodiments, the battery 130 may be a smart battery with an embedded microprocessor. The battery interface 132 is coupled to a regulator (not shown), which assists the battery 130 in providing power V+ to the communications device 100. Although current technology makes use of a battery, future technologies such as micro fuel cells may provide the power to the communications device 100.

The main processor 102, in addition to its operating system functions, enables execution of software applications 134 on the communications device 100. The subset of software applications 134 that control basic device operations, including data and voice communication applications, will normally be installed on the communications device 100 during its manufacture.

The software applications 134 may include a message application 136. The message application 136 can be any suitable software program that allows a subscriber or user of the communications device 100 to send and receive electronic messages. Various alternatives exist for the message application 136 as is well known to those skilled in the art. Messages that have been sent or received by the user are typically stored in the flash memory 108 of the communications device 100 or some other suitable storage element in the communications device 100. In an alternative embodiment, some of the sent and received messages may be stored remotely from the device 100 such as in a data store of an associated host system that the communications device 100 communicates with.

The software applications 134 may also include a blacklist/whitelist client module 137 for managing spam in accordance with various embodiments of the invention, as will be described in detail further below.

Another program that may be executed by the communications device 100 is a password approval module 138 that may provide approval for user passwords. The password approval module 138 may execute a password approval method to determine whether the user password specified by the user of the communications device 100 is approved.

The communications device 100 may further include a device state module 140, an address book 142, a Personal Information Manager (PIM) 144, and other modules 146. The device state module 140 may provide persistence, i.e. the device state module 140 ensures that important device data is stored in persistent memory, such as the flash memory 108, so that the data is not lost when the communications device 100 is turned off or loses power.

The address book 142 may provide information for a list of contacts for the user. For a given contact in the address book, the information can include the name, phone number, work address and email address of the contact, among other information. As will be explained further below, the contents of address book 142 may be one possible source for a list of contacts to be added to a whitelist for the user of communications device 100.

The other modules 146 may include a configuration module (not shown) as well as other modules that can be used in conjunction with the SIM/RUIM interface 128.

The PIM 144 may have functionality for organizing and managing data items of interest to a user, such as, but not limited to, email, calendar events, voice mails, appointments, and task items. A PIM application has the ability to send and receive data items via the wireless network 200. PIM data items may be seamlessly integrated, synchronized, and updated via the wireless network 200 with the communications device user's corresponding data items stored and/or associated with a host computer system. This functionality creates a mirrored host computer on the communications device 100 with respect to such items. This can be particularly advantageous when the host computer system is the communications device user's office computer system.

Additional applications may also be loaded onto the communications device 100 through at least one of the wireless network 200, the auxiliary I/O subsystem 112, the data port 114, the short-range communications subsystem 122, or any other suitable device subsystem 124. This flexibility in application installation increases the functionality of the communications device 100 and may provide enhanced on-device functions, communication-related functions, or both. For example, secure communication applications may enable electronic commerce functions and other such financial transactions to be performed using the communications device 100.

The data port 114 enables a subscriber or user to set preferences through an external device or software application and extends the capabilities of the communications device 100 by providing for information or software downloads to the communications device 100 other than through a wireless communication network. The alternate download path may, for example, be used to load an encryption key onto the communications device 100 through a direct and thus reliable and trusted connection to provide secure device communication.

The data port 114 can be any suitable port that enables data communication between the communications device 100 and another computing device. The data port can be a serial or a parallel port. In some instances, the data port 114 can be a USB port that includes data lines for data transfer and a supply line that can provide a charging current to charge the battery 130 of the communications device 100.

The short-range communications subsystem 122 provides for communication between the communications device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an email message, or web page download will be processed by the communication subsystem 104 and input to the main processor 102. The main processor 102 will then process the received signal for output to the display 110 or alternatively to the auxiliary I/O subsystem 112. A subscriber or user may also compose data items, such as email messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the communications device 100 is substantially similar, except that the received signals are output to the speaker 118, and signals for transmission are generated by the microphone 120. Alternative voice or audio I/O subsystems, such as a voice message recording subsystem, can also be implemented on the communications device 100. Although voice or audio signal output is accomplished primarily through the speaker 118, the display 110 can also be used to provide additional information such as the identity of a calling party, duration of a voice call, or other voice call related information.

Figure 2:
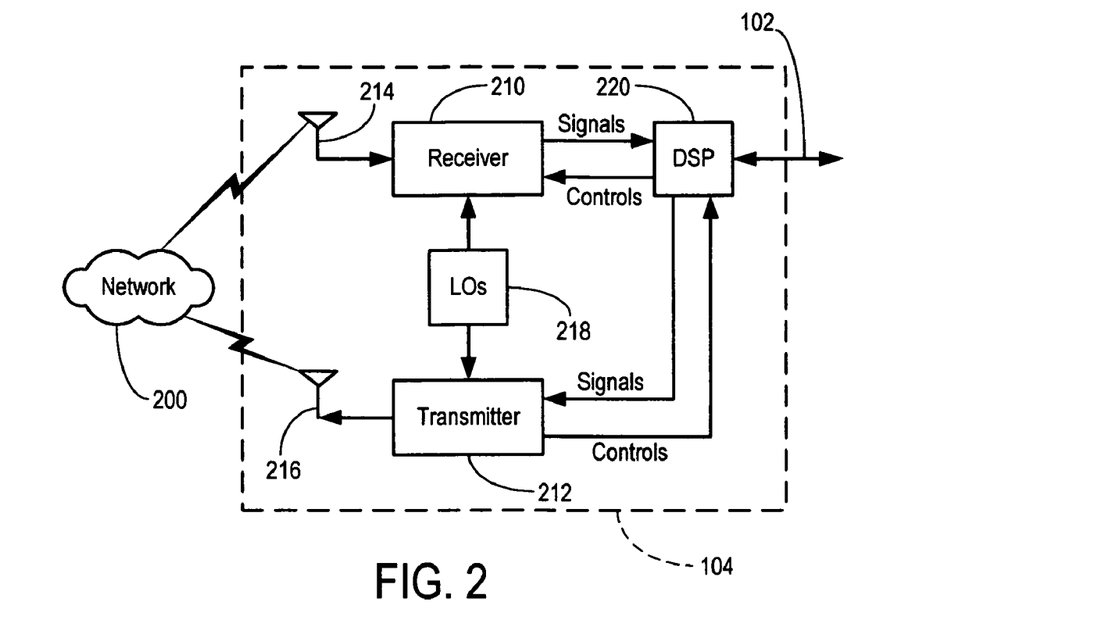
FIG. 2 is a schematic block diagram of a communication subsystem component of the communications device of FIG. 1.

Referring now to FIG. 2, a block diagram of the communication subsystem component 104 of FIG. 1 is shown. The communication subsystem 104 may comprise a receiver 210 and a transmitter 212, as well as associated components such as one or more embedded or internal antenna elements 214, 216, Local Oscillators (LOs) 218, and a processing module such as a Digital Signal Processor (DSP) 220. As will be apparent to those skilled in the field of communications, the particular design of the communication subsystem 104 is dependent upon the communication network with which the communications device 100 is intended to operate. Thus, it should be understood that the design illustrated in FIG. 2 serves only as one example.

Signals received by the antenna 214 through the wireless network 200 are input to the receiver 210, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 220. In a similar manner, signals to be transmitted are processed, including modulation and encoding, by the DSP 220. These DSP-processed signals are input to the transmitter 212 for digital-to-analog (D/A) conversion, frequency up conversion, filtering, amplification and transmission over the wireless network 200 via the antenna 216. The DSP 220 not only processes communication signals, but also provides for receiver and transmitter control. For example, the gains applied to communication signals in the receiver 210 and transmitter 212 can be adaptively controlled through automatic gain control algorithms implemented in the DSP 220.

The wireless link between the communications device 100 and the wireless network 200 can contain one or more different channels, typically different RF channels, and associated protocols used between the communications device 100 and the wireless network 200. An RF channel is a limited resource that must be conserved, typically due to limits in overall bandwidth and limited battery power of the communications device 100.

When the communications device 100 is fully operational, the transmitter 212 is typically keyed or turned on only when it is transmitting to the wireless network 200 and is otherwise turned off to conserve resources. Similarly, the receiver 210 is periodically turned off to conserve power until it is needed to receive signals or information (if at all) during designated time periods.

Figure 3:
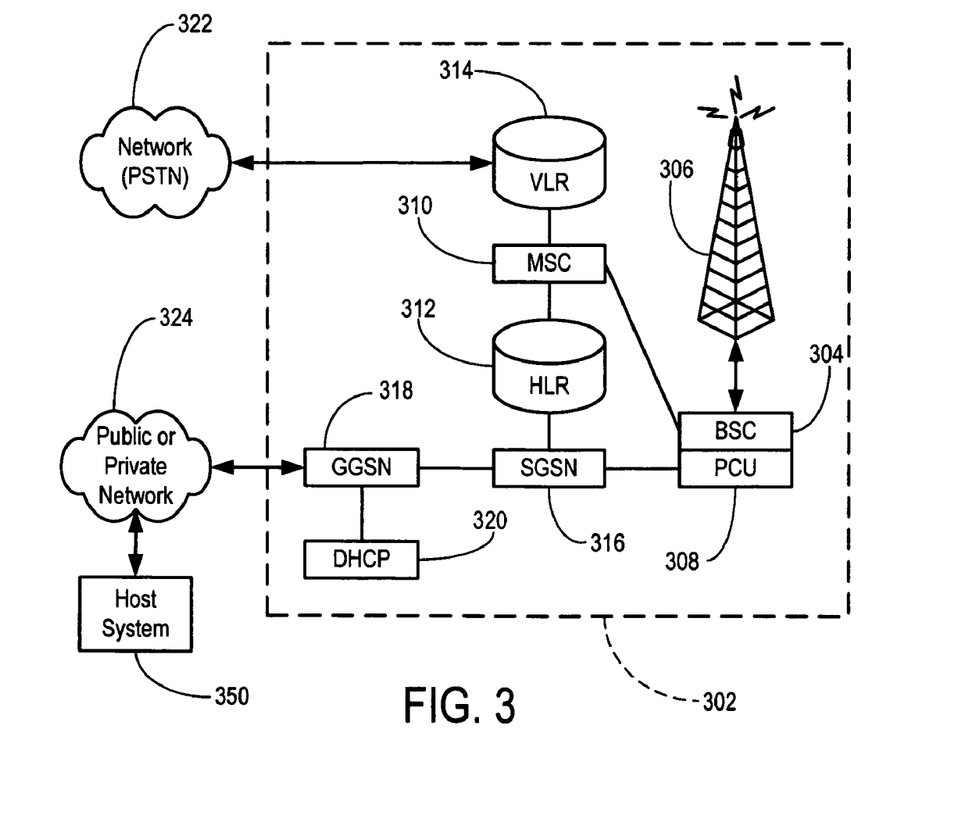
FIG. 3 is a schematic block diagram of an illustrative node of a wireless network with which the communications device of FIG. 1 may communicate.

Referring now to FIG. 3, a block diagram of an exemplary implementation of a node of the wireless network 200 is shown as 302. In practice, the wireless network 200 comprises one or more nodes 302. The communications device 100 communicates with the node 302. In the exemplary implementation of FIG. 3, the node 302 is configured in accordance with General Packet Radio Service (GPRS) and Global Systems for Mobile (GSM) technologies. The node 302 includes a base station controller (BSC) 304 with an associated tower station 306, a Packet Control Unit (PCU) 308 added for GPRS support in GSM, a Mobile Switching Center (MSC) 310, a Home Location Register (HLR) 312, a Visitor Location Registry (VLR) 314, a Serving GPRS Support Node (SGSN) 316, a Gateway GPRS Support Node (GGSN) 318, and a Dynamic Host Configuration Protocol (DHCP) 320. This list of components is not meant to be an exhaustive list of the components of every node 302 within a GSM/GPRS network, but rather a list of components that are commonly used in communications through the wireless network 200.

In a GSM network, the MSC 310 is coupled to the BSC 304 and to a landline network, such as a Public Switched Telephone Network (PSTN) 322 to satisfy circuit switching requirements. The connection through PCU 308, SGSN 316 and GGSN 318 to the public or private network (Internet) 324 (also referred to herein generally as a shared network infrastructure) represents the data path for GPRS capable communications devices. In a GSM network extended with GPRS capabilities, the BSC 304 also contains a Packet Control Unit (PCU) 308 that connects to the SGSN 316 to control packet segmentation, radio channel allocation and to satisfy packet switched requirements. To track communications device location and availability for both circuit switched and packet switched management, the HLR 312 is shared between the MSC 310 and the SGSN 316. Access to the VLR 314 is controlled by the MSC 310.

The station 306 is a fixed transceiver station. The station 306 and BSC 304 together form the fixed transceiver equipment. The fixed transceiver equipment provides wireless network coverage for a particular coverage area commonly referred to as a "cell". The fixed transceiver equipment transmits communication signals to and receives communication signals from communications devices within its cell via the station 306. The fixed transceiver equipment normally performs such functions as modulation and possibly encoding and/or encryption of signals to be transmitted to the communications device 100 in accordance with particular, usually predetermined, communication protocols and parameters, under control of its controller. The fixed transceiver equipment similarly demodulates and possibly decodes and decrypts, if necessary, any communication signals received from the communications device 100 within its cell. The communication protocols and parameters may vary between different nodes. For example, one node may employ a different modulation scheme and operate at different frequencies than other nodes.

For all communications devices 100 registered with a specific network, permanent configuration data such as a user profile is stored in the HLR 312. The HLR 312 also contains location information for each registered communications device and can be queried to determine the current location of a communications device. The MSC 310 is responsible for a group of location areas and stores the data of the communications devices currently in its area of responsibility in the VLR 314. Further, the VLR 314 also contains information on communications devices that are visiting other networks. The information in the VLR 314 includes part of the permanent communications device data transmitted from the HLR 312 to the VLR 314 for faster access. By moving additional information from a remote HLR 312 node to the VLR 314, the amount of traffic between these nodes can be reduced so that voice and data services can be provided with faster response times and at the same time require less use of computing resources.

The SGSN 316 and GGSN 318 are elements added for GPRS support; namely packet switched data support, within GSM. The SGSN 316 and MSC 310 have similar responsibilities within the wireless network 200 by keeping track of the location of each communications device 100. The SGSN 316 also performs security functions and access control for data traffic on the wireless network 200. The GGSN 318 provides Internetworking connections with external packet switched networks and connects to one or more SGSN's 316 via an Internet Protocol (IP) backbone network operated within the network 200. During normal operations, a given communications device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 320 to be connected to the GGSN 318. There are many mechanisms for dynamic IP assignment, including using a combination of a Remote Authentication Dial-In User Service (RADIUS) server and DHCP server. Once the GPRS Attach is complete, a logical connection is established from the communications device 100, through the PCU 308, and the SGSN 316 to an Access Point Node (APN) within the GGSN 318. The APN represents a logical end of an IP tunnel that can either access direct Internet compatible services or private network connections. The APN also represents a security mechanism for the wireless network 200, insofar as each communications device 100 must be assigned to one or more APNs and the communications devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunnelling methods such as IP over IP as in the case with some IPSecurity (IPsec) connections used with Virtual Private Networks (VPN). These tunnels are also referred to as Packet Data Protocol (PDP) contexts and there are a limited number of these available in the wireless network 200. To maximize use of the PDP Contexts, the wireless network 200 will run an idle timer for each PDP Context to determine if there is a lack of activity. When the communications device 100 is not using its PDP Context, the PDP Context can be de-allocated and the IP address returned to the IP address pool managed by the DHCP server 320.

Figure 4:
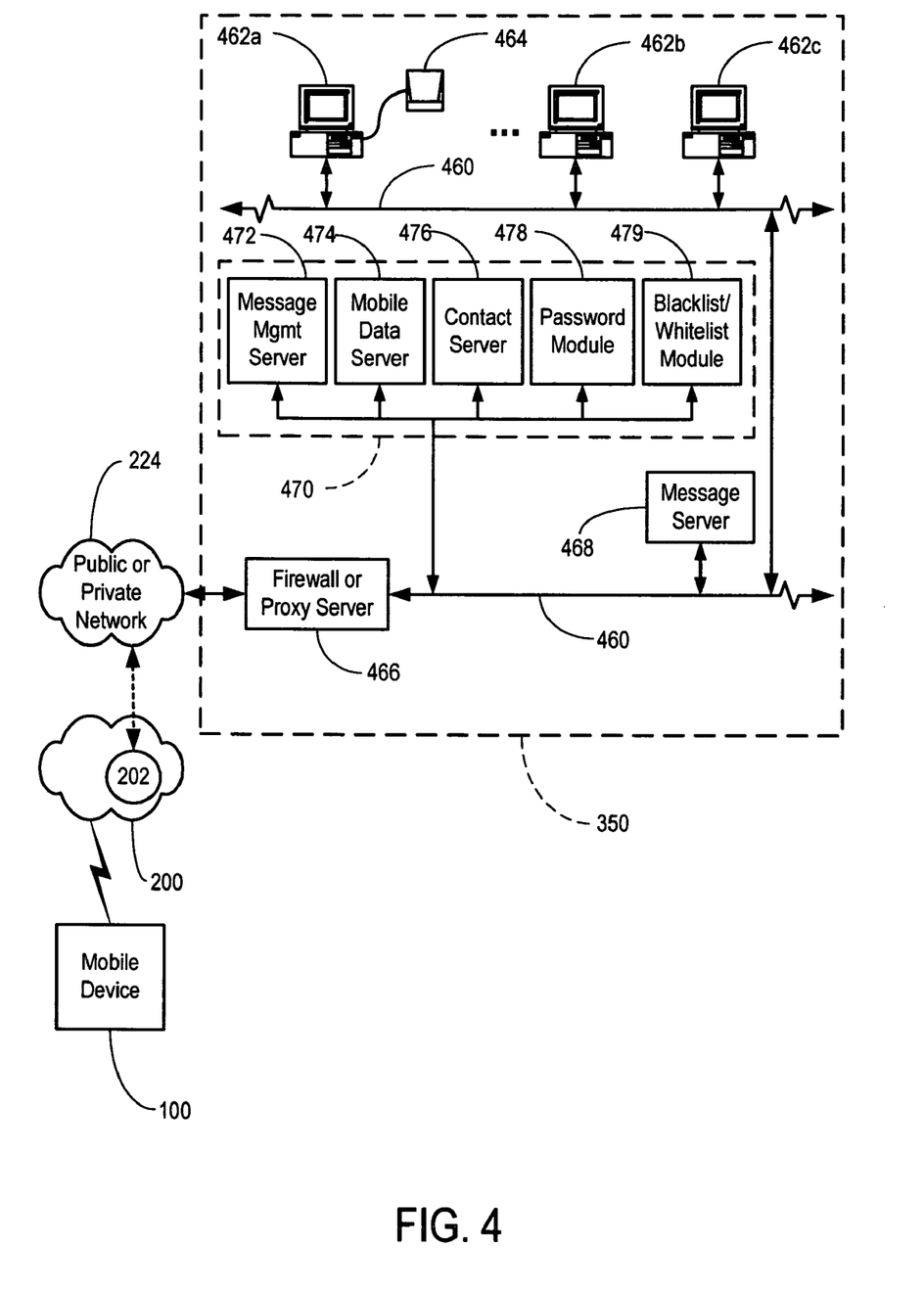
FIG. 4 is a schematic block diagram of an illustrative host system with which the communications device of FIG. 1 may communicate.

Referring now to FIG. 4, shown therein is a block diagram illustrating components of an exemplary configuration of a host system 350. In one instance, the host system 350 can be a corporate enterprise. The host system 350 will typically be a corporate office or other local area network (LAN), but may also be a home office computer system or some other private system, for example, in variant implementations. In the example shown in FIG. 4, the host system 350 is depicted as a LAN of an organization to which a user of the communications device 100 belongs. Typically, a plurality of communications devices can communicate wirelessly with the host system 350 through one or more nodes 302.

The host system 350 comprises a number of network components connected to each other by the LAN connections 460. For instance, a user's desktop computer 462a with an accompanying cradle 464 for the user's communications device 100 is situated on a LAN connection. The cradle 464 for the communications device 100 can be coupled to the computer 462a by a serial or a Universal Serial Bus (USB) connection, for example. Other user computers 462b are also situated on the LAN 460, and each may or may not be equipped with an accompanying cradle 464 that is suitable for a communications device. The cradle 464 facilitates the loading of information (e.g. PIM data, private symmetric encryption keys to facilitate secure communications between the communications device 100 and the host system 350, etc) from the user computer 462a to the communications device 100, and may be particularly useful for bulk information updates often performed in initializing the communications device 100 for use. The information downloaded to the communications device 100 may include certificates used in the exchange of messages.

It will be understood by persons skilled in the art that the user computers 462a, 462b, 462c will typically also be connected to other peripheral devices, such as printers, etc. which are not explicitly shown in FIG. 4. Furthermore, only a subset of network components of the host system 350 are shown in FIG. 4 for ease of exposition, and it will be understood by persons skilled in the art that the host system 350 will comprise additional components that are not explicitly shown in FIG. 4 for this exemplary configuration. More generally, the host system 350 may represent a smaller part of a larger network (not shown) of the organization, and may comprise different components and/or be arranged in different topologies than that shown in the exemplary embodiment of FIG. 4.

In this exemplary embodiment, the communications device 100 communicates with the host system 350 through node 302 of the wireless network 200 and a shared network infrastructure 324 such as a service provider network or the public Internet. Access to the host system 350 may be provided through one or more routers (not shown), and computing devices of the host system 350 may operate from behind a firewall or proxy server 466. The proxy server 466 provides a secure node and a wireless Internet gateway for the host system 350. The proxy server 466 intelligently routes data to the correct destination server.

In some implementations, the host system 350 can include a wireless VPN router (not shown) to facilitate data exchange between the host system 350 and the communications device 100. The wireless VPN router allows a VPN connection to be established directly through a specific wireless network to the communications device 100. The wireless VPN router can be used with the Internet Protocol (IP) Version 6 (IPV6) and IP-based wireless networks. This protocol can provide enough IP addresses so that each communications device has a dedicated IP address, making it possible to push information to a communications device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the communications device 100 in this alternative implementation.

Messages intended for a user of the communications device 100 are initially received by a message server 468 of the host system 350. Such messages may originate from any number of sources. For instance, a message may have been sent by a sender from the computer 462b within the host system 350, from a different communications device (not shown) connected to the wireless network 200 or to a different wireless network, or from a different computing device or other device capable of sending messages, via the shared network infrastructure 324, possibly through an application service provider (ASP) or Internet service provider (ISP), for example.

The message server 468 typically acts as the primary interface for the exchange of messages, particularly email messages, within the organization and over the shared network infrastructure 324. Each user in the organization that has been set up to send and receive messages is typically associated with a user account managed by the message server 468. Some exemplary implementations of the message server 468 include a Microsoft Exchange™ server, a Lotus Domino™ server, a Novell Groupwise™ server, or another suitable mail server installed in a corporate environment. In some implementations, the host system 350 may comprise multiple message servers 468. The message server 468 may also be adapted to provide additional functions beyond message management, including the management of data associated with calendars and task lists, for example.

When messages are received by the message server 468, they are typically stored in a data store associated with the message server 468. In some embodiments, the data store may be a separate hardware unit (not shown) that the message server 468 communicates with. Messages can be subsequently retrieved and delivered to users by accessing the message server 468. For instance, an email client application operating on a user's computer 462a may request the email messages associated with that user's account stored on the data store associated with the message server 468. These messages are then retrieved from the data store and stored locally on the computer 462a. The data store associated with the message server 468 can store copies of each message that is locally stored on the communications device 100. Alternatively, the data store associated with the message server 468 can store all of the messages for the user of the communications device 100 and only a smaller number of messages can be stored on the communications device 100 to conserve memory. For instance, the most recent messages (in the past two to three months for example) can be stored on the communications device 100.

When operating the communications device 100, the user may wish to have email messages retrieved for delivery to the handheld. An email client application operating on the communications device 100 may also request messages associated with the user's account from the message server 468. The email client may be configured (either by the user or by an administrator, possibly in accordance with an organization's information technology (IT) policy) to make this request at the direction of the user, at some pre-defined time interval, or upon the occurrence of some pre-defined event. In some implementations, the communications device 100 is assigned its own email address, and messages addressed specifically to the communications device 100 are automatically redirected to the communications device 100 as they are received by the message server 468.

To facilitate the wireless communication of messages and message-related data between the communications device 100 and components of the host system 350, a number of wireless communication support components 470 may be provided. In some implementations, the wireless communication support components 470 can include a message management server 472, a mobile data server 474, a contact server 476, a password policy module 478, a blacklist/whitelist server module 479, and the like.

The message management server 472 can be used to specifically provide support for the management of messages, such as email messages, that are to be handled by communications devices. Generally, while messages are still stored on the message server 468, the message management server 472 can be used to control when, if, and how messages are sent to the communications device 100. The message management server 472 also facilitates the handling of messages composed on the communications device 100, which are sent to the message server 468 for subsequent delivery.

For example, the message management server 472 may monitor the user's "mailbox" (e.g. the message store associated with the user's account on the message server 468) for new email messages, and apply user-definable filters to new messages to determine if and how the messages are relayed to the user's communications device 100. The message management server 472 may also compress and encrypt new messages (e.g. using an encryption technique such as Data Encryption Standard (DES) or Triple DES) and push them to the communications device 100 via the shared network infrastructure 324 and the wireless network 200. The message management server 472 may also receive messages composed on the communications device 100 (e.g. encrypted using Triple DES), decrypt and decompress the composed messages, re-format the composed messages if desired so that they will appear to have originated from the user's computer 462a, and re-route the composed messages to the message server 468 for delivery.

Certain properties or restrictions associated with messages that are to be sent from and/or received by the communications device 100 can be defined (e.g. by an administrator in accordance with IT policy) and enforced by the message management server 472. These may include whether the communications device 100 may receive encrypted and/or signed messages, minimum encryption key sizes, whether outgoing messages must be encrypted and/or signed, and whether copies of all secure messages sent from the communications device 100 are to be sent to a pre-defined copy address, for example.

The message management server 472 may also be adapted to provide other control functions, such as only pushing certain message information or pre-defined portions (e.g. "blocks") of a message stored on the message server 468 to the communications device 100. For example, in one instance, when a message is initially retrieved by the communications device 100 from the message server 468, the message management server 472 may push only the first part of a message to the communications device 100, with the part being of a pre-defined size (e.g. 2 KB). The user can then request more of the message, to be delivered in similar-sized blocks by the message management server 472 to the communications device 100, possibly up to a maximum pre-defined message size. Accordingly, the message management server 472 facilitates better control over the type of data and the amount of data that is communicated to the communications device 100, and can help to minimize potential waste of bandwidth or other resources.

The mobile data server 474 encompasses any other server that stores information that is relevant to the corporation. The mobile data server 474 may include, but is not limited to, databases, online data document repositories, customer relationship management (CRM) systems, or enterprise resource planning (ERP) applications.

The contact server 476 can provide information for a list of contacts for the user in a similar fashion to the address book 142 on the communications device 100. Accordingly, for a given contact, the contact server 476 can include the name, phone number, work address and email address of the contact, among other information. The contact server 476 can also provide a global address list that contains the contact information for all of the contacts associated with the host system 350.

The IT administrator can use the password policy module 478 to update the password policy by, for example, updating a list of pre-specified forbidden passwords and their symbolic equivalents. The IT administrator can also remotely update the password policy of the communications devices by communicating with the password approval module 138 over the network 200 and updating a local copy of the list of pre-specified forbidden passwords and the list of symbolic equivalents. The local copies of these lists can be stored on the flash memory 108 of the communications device 100. Accordingly, the password policy can be maintained centrally and then communicated to various communications devices 100 using a suitable wireless communication infrastructure such as that described herein. In some embodiments, the wireless communication infrastructure includes a transport stack that contains a set of communication protocols that enables the host system 350 to communicate with the communications device 100. A subset of applications provided by the transport stack can be used to pass IT policy commands to the operating system of the communications device 100 and can be used to provide an updated password policy. Alternatively, in some cases, the password policy update can also be done over a wired connection, such as via the cradle 464, for example.

The blacklist/whitelist server module 479 may be used to implement a system and method of managing spam, and may be configured to communicate and interact with the blacklist/whitelist client module 137 of communications device 100 (see FIG. 1). The blacklist/whitelist client module 137 may also communicate and interact with one or more of the message server 468, message management server 472, mobile data server 474, and contact server 476 as may be necessary. The function of the blacklist/whitelist modules will be described in detail further below.

It will be understood by persons skilled in the art that the message server 468, message management server 472, the mobile data server 474, the contact server 476, the password policy module 478, and the blacklist/whitelist server module 479 need not be implemented on separate physical servers within the host system 350. For example, some or all of the functions associated with the message management server 472 may be integrated with the message server 468, or some other server in the host system 350. Furthermore, the host system 350 may comprise multiple message management servers 472, particularly in variant implementations where a large number of communications devices need to be supported.

Figure 5A:
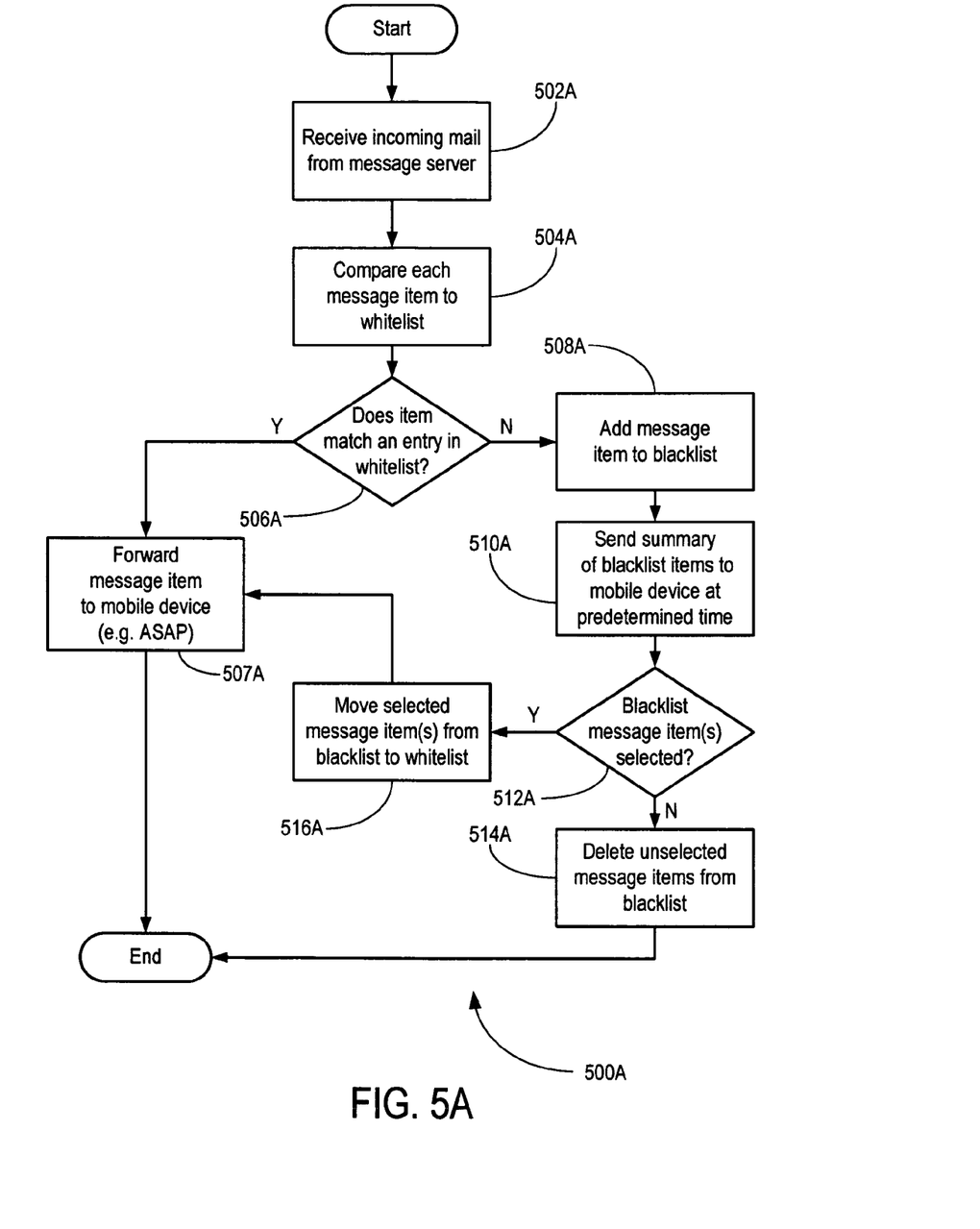
FIG. 5A-5C show illustrative methods in accordance with an embodiment of the invention.
Figure 5B:
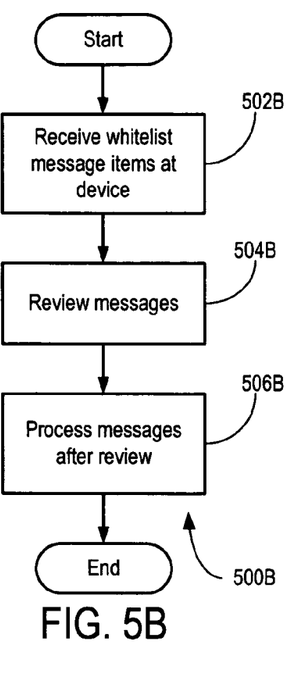
Figure 5C:
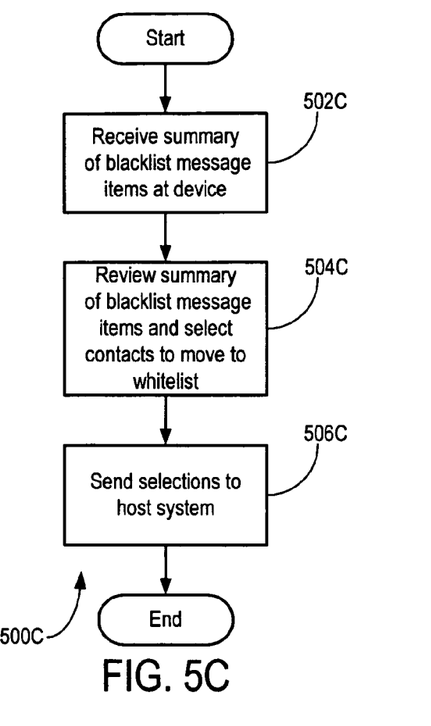

FIG. 5A-5C show flowchart diagrams of illustrative methods 500A, 500B, 500C in accordance with an embodiment of the invention. As shown in FIG. 5A, method 500A begins at step 502A, where incoming email messages are received from a message server (e.g. message server 468 of FIG. 4). Method 500A then proceeds to block 504A, where the contact information for each received message item is compared to contact information on a whitelist associated with the user (e.g. as shown by way of illustration in FIG. 7A further below). This may be done, for example, by looking at the header information of the message items, and comparing the sender's email address with a list of email addresses stored in the whitelist. Method 500A then proceeds to decision block 506A, where method 500A checks to see if there are any matches. Alternatively, or in addition, the whitelist may contain some other piece of data that may authenticate the sender of a message, such as a digital key or digital signature.

If at decision block 506A the answer is yes, method 500A proceeds to block 507A, where method 500A proceeds to forward the whitelist message items to a communications device (e.g. communications device 100 of FIG. 1, for example) and ends. Generally speaking, as message items from contacts on the whitelist are likely to be more important to the user, they may be forwarded to the communications device 100 as soon as possible. If communications device 100 is presently connected to the host system (e.g. host system 350 of FIG. 4) via a communications network, such messages from contacts on the whitelist may be forwarded to communications device 100 almost immediately.

If at decision block 506A the answer is no, method 500 proceeds to block 508A, where the unknown or undesirable contact is added to a blacklist (e.g. as shown by way of illustration in FIG. 7B further below). The corresponding message item may also be stored in a temporary data store, such as a temporary blacklist buffer, pending further processing. The temporary blacklist buffer may be provided, for example, in a data store associated with message server 468, or in some other data store associated with blacklist/whitelist server module 479. In an embodiment, the temporary blacklist buffer may be suitably quarantined, so that any viruses or malware executables attached to the blacklist message items do not threaten the host system.

Method 500 may then proceed to block 510A, where a summary of the blacklist message items may be forwarded to the communications device (communications device 100 of FIG. 1, for example). These blacklist message items from unknown or undesirable contacts are less likely to require prompt review. Therefore, this summary of the blacklist items need not be forwarded as soon as possible. Rather, depending on the user's preference, these blacklist message items may be forwarded at predetermined intervals. For example, a user may have a preset preference to receive the blacklist message items at a particular time each afternoon.

As well, in order to minimize communications network charges, only the summary of the blacklist message items is forwarded to the communications device 100. This summary may be extracted from the header information of the message items in the blacklist, and may include, for example, the sender's email address, the time of receipt, and the subject matter line. The summary information may also optionally indicate, for example, whether the email message includes an attachment, and the nature of the attachment (e.g. file type, whether executable, etc.).

Method 500A then proceeds to decision block 512A, where method 500A determines if any of the blacklist message items are selected by a user to be moved to the whitelist. If at decision block 512A the answer is no, method 500A proceeds to block 514A, and the unselected message items are deleted from the blacklist. These message items may then be discarded.

If at decision block 512A the answer is yes, message 500A proceeds to block 516A, where the user selected message items are moved from the blacklist to the whitelist. Method 500A then proceeds to block 509A, where the selected message items newly moved to the whitelist are forwarded to communications device 100, for example.

Now referring to FIG. 5B, shown is an illustrative method 500B that may be practiced on communications device 100, for example. Method 500B starts at block 502B, where whitelist message items are received at communications device 100. The user of communications device 100 may see a list of received message items on a display (e.g. display 110 of FIG. 1), and may select any message item for review. Method 500B then proceeds to block 506B, where the user may process the messages (e.g. replay, archive, delete, forward, etc.) as desired. Method 500B then ends.

Now referring to FIG. 5C, shown is another illustrative method 500C that may be practiced on communications device 100, for example. Method 500C starts at block 502C, where a summary of blacklist items is received. As previously noted, this summary need only contain information sufficient for the user to determine whether to move the message items to the whitelist, such as the sender's email address, the time of receipt, and the subject matter. Method 500C then proceeds to block 504C, where a user may review the summary information and select the item or items to move to the whitelist.

Figure 6:
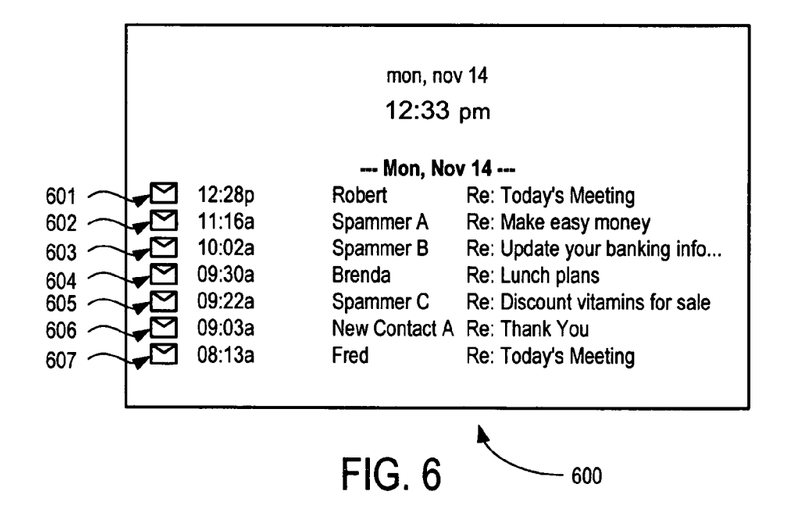
FIG. 6 shows an illustrative display of messages received and displayed on the communications device of FIG. 1.

Referring to FIG. 6, there is shown an illustrative display 600 of messages received and displayed on a communications device (e.g. mobile communications device 100 of FIG. 1) without any filtering per se. As shown in FIG. 6, message items 601 to 607 that have been forwarded to communications device 100 include a number of spam messages (form Spammer A, etc.), as well as some legitimate messages. In this illustration, a user of communications device 100 has already received the spam messages at the communications device 100, and must sort through the spam messages and the legitimate messages in order to decide which email messages to review and which to delete. This is undesirable, as any spam messages that have been downloaded to device 100 may have already consumed significant bandwidth, and may represent a potential threat for communications device 100. As well, unless the user of communications device 100 is on a flat rate plan, the downloading of the spam messages may have cost the user significant communications charges.

To overcome the limitations inherent in FIG. 6, an illustrative example of a system and method of dynamically managing a spam blacklist in accordance with an embodiment of the present invention is now provided below with reference to FIGS. 7A to 10.

EXAMPLE

Figure 7A:
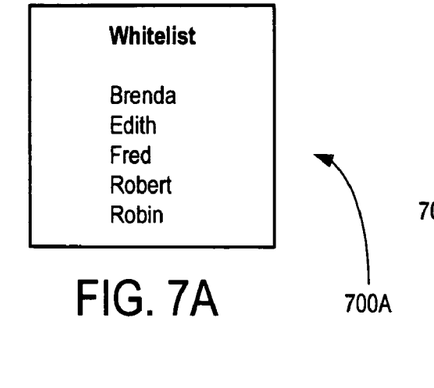
FIG. 7A shows an illustrative whitelist associated with the user of the communications device of FIG. 1.

Referring to FIG. 7A, there is shown an illustrative whitelist 700A associated with a user of communications device 100. In this illustrative example, the whitelist 700A includes the following contacts: Brenda, Edith, Fred, Robert and Robin. This whitelist 700A may comprise, for example, contacts from the user's address book 142 (FIG. 1) mentioned earlier. This whitelist 700A may also include contacts from within the user's organization, or contacts screened for addition to the whitelist based on some other criteria set by an IT administrator. Thus, the whitelist 700A may be managed in part by the user, and may possibly be co-managed by an IT administrator.

It will be appreciated that the user and/or IT administrator may also remove contacts from the whitelist 700A if the contacts are no longer required, or if the contact information is out-of-date. The user and/or IT administrator may update the whitelist 700A on a periodic basis, or as required, in order to keep the whitelist 700A properly maintained.

Figure 7B:
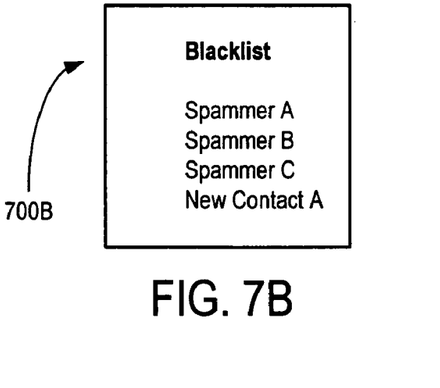
FIG. 7B shows an illustrative blacklist associated with the user of the communications device of FIG. 1.

Referring to FIG. 7B, shown is an illustrative blacklist 700B associated with the user of communications device 100. As will be explained, this blacklist 700B is dynamic in the sense that, at any given time, it may change to include any contacts for incoming message items that have not been identified as being on the whitelist 700A. In this illustrative example, the blacklist 700B contains, at a particular point in time, the following unknown or undesirable contacts: Spammer A, Spammer B, Spammer C, and New Contact A. As previously noted, this blacklist 700B may also be associated with a temporary blacklist buffer for storing the corresponding message items. For example, the temporary blacklist buffer may reside in a data store within each computer 462a, 462b, 462c, or alternatively on another data store connected to LAN 460 (FIG. 4). The contents of the temporary blacklist buffer will change dynamically in accordance with the changing contacts in blacklist 700B.

Figure 8A:
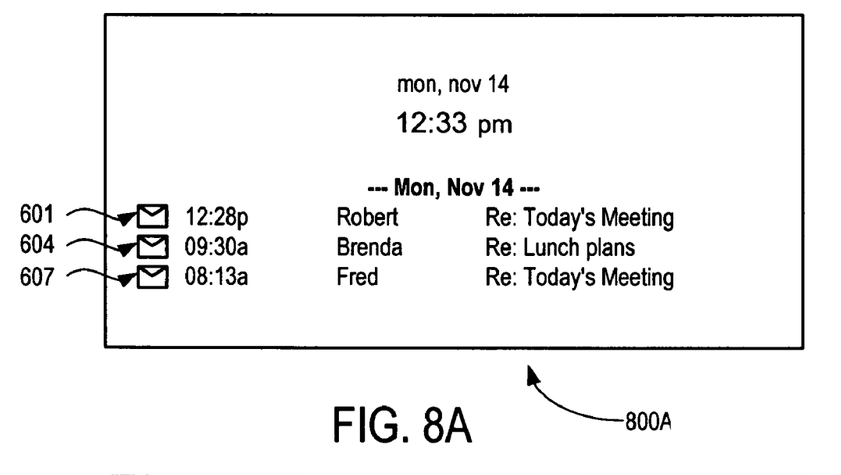
FIG. 8A shows an illustrative display of messages filtered through the whitelist of FIG. 7A and delivered to the communications device of FIG. 1.

Now referring to FIG. 8A, shown is an illustrative display 800A of message items filtered through whitelist 700A and delivered to the communications device 100 of FIG. 1. These message items are from contacts already on the user's whitelist 700A, and therefore are most likely to require prompt attention by the user. Thus, these message items may be pushed down to communications device 100 as soon as possible, or relatively frequently (e.g. on an hourly basis).

For message items on the blacklist 700B, in accordance with the illustrative methods 500B, 500C described above, a user challenge-response system is used. More generally, at a pre-determined interval (e.g. daily, weekly, etc.), a summary of contacts in blacklist 700B may be pushed down to the communications device 100 for review by the user. In the example shown in FIG. 8B, the user is shown an illustrative display 800B of a summary of suspected spam messages 801 to 804 from contacts presently on blacklist 700B. The summary information may include, for example, the name of the unknown or undesirable contact, the original time of receipt of the corresponding message, and the subject or "Re:" line. Note that this is a summary of the message items, and the actual contents of the message items or any attachments have not been pushed down to communications device 100 at this time.

Figure 8B:
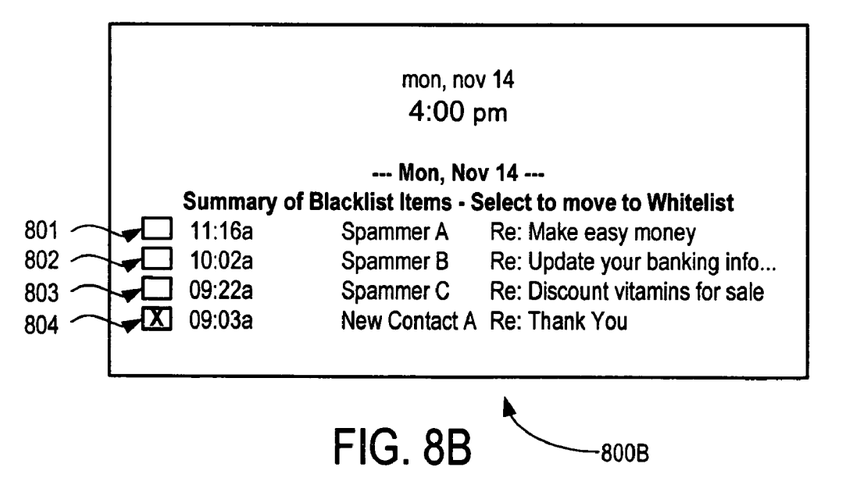
FIG. 8B shows an illustrative display of a summary of suspected spam messages placed on the blacklist of FIG. 7B.

Associated with each summary of each blacklist message item may be an action field selectable by a user action, such as a checkbox as shown in FIG. 8B. In the illustrative example, after reviewing the summary information, the user has selected the contact for message item 804 (i.e. New Contact A) to be transferred to the whitelist. As shown, the user selection can be indicated by a visual indication, such as an "X" placed within the checkbox.

This user selection is detected by blacklist/whitelist client module 137 of communications device 100, and may be communicated back to the blacklist/whitelist server module 479 of the host system 350, or a blacklist/whitelist module installed on the user's computer system (e.g. one of computer systems 462a, 462b, 462c). In response, the blacklist/whitelist server module 479 (or the blacklist/whitelist module installed on the user's computer system) may update the list of contacts in the corresponding whitelist, and initiate delivery of the corresponding message from the temporary blacklist buffer to communications device 100.

Figure 9A:
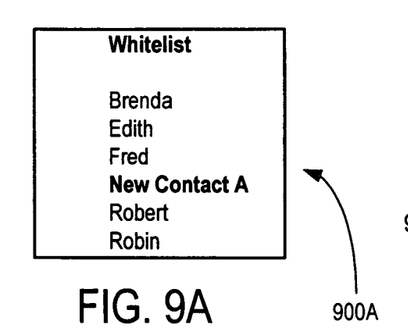
FIG. 9A shows an updated whitelist associated with the user of the communications device of FIG. 1.
Figure 9B:
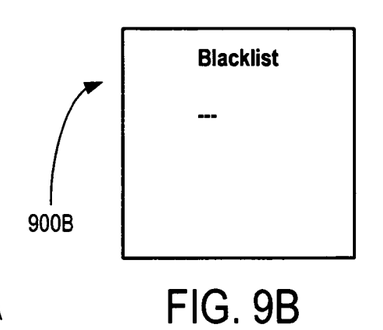
FIG. 9B shows an updated blacklist associated with the user of the communications device of FIG. 1.

By way of illustration, FIG. 9A shows an updated whitelist 900A, based on the user's selection as shown in FIG. 8B. As well, FIG. 9B shows an updated blacklist 900B, in which unknown or undesirable contacts not selected by the user at FIG. 8B have been deleted. This non-selection may be communicated by blacklist/whitelist client module 137 back to the host system, and all corresponding message items remaining in the temporary blacklist buffer may also be purged.

Figure 10:
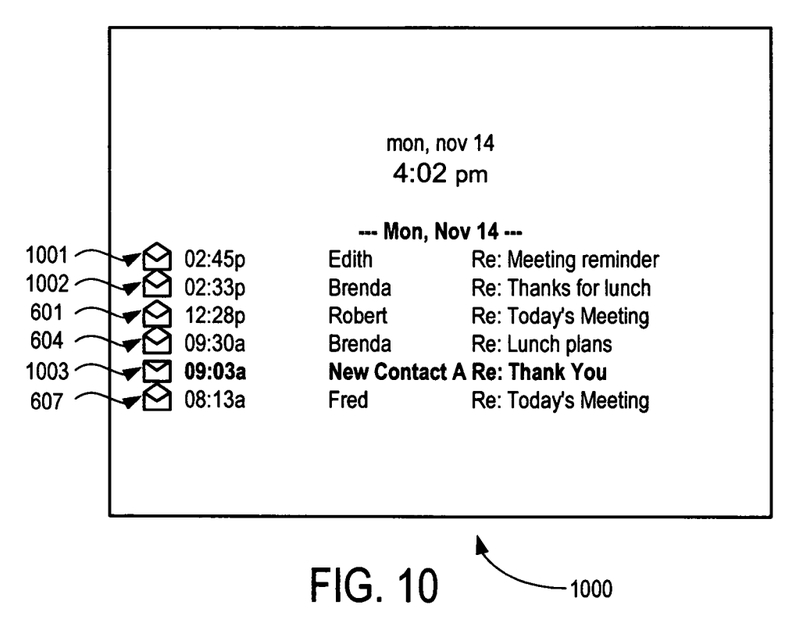
FIG. 10 shows an illustrative display of a message released from the blacklist of FIG. 7B, transferred to the whitelist of FIG. 9A, and delivered to the communications device of FIG. 1.

By way of illustration, as shown in FIG. 10, a display 1000 of messages shows the newly released message item 1003 from New Contact A that has been pushed down to communications device 100, as well as some other message items 1001, 1002 from whitelist contacts that had been previously forwarded to communications device 100 earlier in the afternoon. The user may now review the contents of the new message from New Contact A, and process the message in the usual manner.

In an alternative embodiment, the contacts in the blacklist and the corresponding message items in the temporary blacklist buffer may remain there until the user of communications device 100 explicitly deletes the contact. For example, rather than allowing only two actions: (1) selection or (2) no selection; the action field of FIG. 8B may alternatively permit one of three actions for each contact: (1) select for transfer to whitelist, (2) delete from blacklist (and thus also delete the corresponding message item from the temporary blacklist buffer), or (3) keep the summary information for the time being for further consideration by the user on selection or deletion. This may allow the user to defer a decision to receive or not receive a message until a more convenient time, or until further information on the sender can be obtained.

In yet another embodiment, rather than permanently discarding unknown or undesirable contact information from the blacklist, the contact may be identified as a known spammer, and placed on a persistent spam blacklist that may be used to pre-screen incoming email messages at mail server 468 (FIG. 4), even before they are forwarded to user computers 462a, 462b, 462c and added to the dynamic blacklist (e.g. blacklist 700B) as described above. This may thus save the user from having to repeatedly reject email from the same spammer in the manner described above.

Alternatively, rather than not adding such spammers to the dynamic blacklist, contacts that are recognized as having been previously rejected by a user may be identified as such by a suitable visual indication (e.g. with an icon, or different font, or boldfacing, etc.). This may permit a user to review the summary information for message items from any such contacts to determine if an error may have been made in previously identifying the contact as a spammer.

While various illustrative embodiments have been described above, it will be understood that various modifications may be made without departing from the scope of the invention. For example, rather than sending a summary of every blacklist message item to a communications device, the summary of blacklist items may be made available at an Internet address or URL (Uniform Resource Locator) link to a web page accessible via a wireless Internet browser application provided on the communications device. Thus, a user can view the summary list of blacklist messages at the web page, and select the contacts that the user wants to have moved to the whitelist (and thereby have the corresponding message items transmitted down to the communications device). Thus, rather than communicating the user selection directly to the host system from the communications device, the user selection may be communicated indirectly to the host system via the web page.

In yet another embodiment, rather than having all unrecognized contacts for incoming message items automatically added to a blacklist, some predetermined filtering criteria may be used (e.g. based on established message forwarding rules, IT policies, subject threads, etc.) to identify contacts for message items with the highest probability of being legitimate contacts that likely belong on the whitelist, and these contacts may then be automatically added to the whitelist based on some threshold value. This alternative embodiment may provide a user with the flexibility of a blended system that combines a degree of automatic selection of contacts for addition to a whitelist based on predetermined criteria, together with the ability to manually select other contacts from a blacklist.

It will also be understood that, while the embodiments have been described for a mobile communications device, the invention may be generally applicable to any communications, computing or data processing device in which spam management may be required.

As will be appreciated, the rationale for this invention is that, for the majority of the time, a user communicates with usual contacts in his/her whitelist (i.e., people within an organization, contacts in address book, etc). For the minority of time that the user communicates with a new contact, the user can normally afford to delay viewing and responding to these messages until a more convenient time.

With dynamic management of a blacklist through periodic review of a summary of blacklist items, as described above, a user may handle unwanted emails more efficiently, and may also significantly reduce unnecessary usage of network resources and network communications charges.

Thus, in an aspect of the invention, there is provided a computer-implemented method for managing spam directed to a communications device, the computer-implemented method comprising: comparing a contact for each incoming message item to contacts on a whitelist; if the contact is not found on the whitelist, then adding the contact to a blacklist based on predetermined criteria; at a selected time, making available to the communications device a summary of each message item corresponding to a contact on the blacklist; receiving a user selection of a contact to transfer from the blacklist to the whitelist.

In an embodiment, the method further comprises transmitting to the communications device any message items corresponding to a contact on the whitelist.

In another embodiment, the method further comprises providing the user with a selection means for selecting a contact to transfer from the blacklist to the whitelist.

In another embodiment, the method further comprises storing in a temporary blacklist buffer any message items corresponding to a contact on the blacklist.

In yet another embodiment, the method further comprises, at a selected time, deleting from the temporary blacklist buffer any message items corresponding to a contact not selected by the user for transfer to the whitelist.

In still another embodiment, the method further comprises, at a selected time, deleting from the temporary blacklist buffer any message items corresponding to a contact selected for deletion from the blacklist.

In another embodiment, the method further comprises: adding any non-selected contact to a persistent spam blacklist; rejecting further incoming message items with a contact corresponding to a contact on the persistent spam blacklist.

In another aspect of the invention, there is provided a communications device comprising: (a) a main processor that controls the operation of the communications device; (b) a communication subsystem connected to the main processor, the communication subsystem configured to send data to and receive data from a host system; (c) a blacklist/whitelist module executable by the main processor for managing spam directed to the communications device by: i) receiving a summary of each message item corresponding to a contact on a blacklist; ii) providing a selection means operable by a user for selecting a contact for transfer from the blacklist to the whitelist; iii) communicating the user selection to the host system.

In an embodiment, the selection means comprises an action field associated with each message item summary, the action field being selectable by a user action.

In another embodiment, the action field provides a visual indication of selection.

In another embodiment, the selection means comprises and action field associated with each message item summary, the action field having a plurality of selectable options.

In yet another embodiment, the plurality of selectable options includes selection of a contact for transfer to the whitelist, deletion of a contact from the blacklist, and maintaining a contact on the blacklist pending further review.

In another aspect of the invention, there is provided a computer readable medium storing computer code that, when loaded into a computing device, adapts the device to manage spam directed to a communications device, the computer readable medium including: code for comparing a contact for each incoming message item to contacts on a whitelist; code for adding the contact for the incoming message to a blacklist based on predetermined criteria, if the contact is not found on the whitelist; code for making available to the communications device, at a selected time, a summary of each message item corresponding to a contact on the blacklist; code for receiving a user selection of a contact to transfer from the blacklist to the whitelist. Computer readable medium does not include signals or carrier waves.

In an embodiment, the computer readable medium further includes code for transmitting to the communications device any message items corresponding to a contact on the whitelist.

In another embodiment, the computer readable medium further includes code for providing the user with a selection means for selecting a contact to transfer from the blacklist to the whitelist.

In another embodiment, the computer readable medium further includes code for storing in a temporary blacklist buffer any message items corresponding to a contact on the blacklist.

In yet another embodiment, the computer readable medium further includes code for deleting from the temporary blacklist buffer, at a selected time, any message items corresponding to a contact not selected by the user for transfer to the whitelist.

In still another embodiment, the computer readable medium further includes code for deleting from the temporary blacklist buffer, at a selected time, any message items corresponding to a contact selected for deletion from the blacklist.

In another embodiment, the computer readable medium further includes code for adding any non-selected contact to a persistent spam blacklist; code for rejecting further incoming message items with a contact corresponding to a contact on the persistent spam blacklist.

In a further embodiment, the computer readable medium further includes code for automatically adding the contact for the incoming message to a whitelist based on the predetermined criteria.

More generally, the scope of the invention is defined by the following claims.

What is claimed is:

1. A computer-implemented method to manage messages directed to a mobile communications device, the computer-implemented method comprising:

receiving from a blacklist/whitelist server module of a host system, at a blacklist/whitelist client module on the mobile communications device, summary information corresponding to message items received from contacts not found on a whitelist at the blacklist/whitelist server module of the host system, wherein the blacklist/whitelist client module on the mobile communications device is to detect selection of a message item from the summary information and to determine at the blacklist/whitelist client module that a contact of the selected message item should be moved to the whitelist at the host system; and sending to the host system an identification of the contact to transfer to the whitelist;

receiving, at the blacklist/whitelist server module, the selected message item;

comparing, at the blacklist/whitelist server module, the contact of the selected message item to the whitelist;

when the contact is not found on the whitelist, adding the contact to a blacklist;

after adding the contact to the blacklist, storing in a temporary blacklist buffer the message item;

after receiving the identification of the contact to transfer from the whitelist, transmitting to the mobile communications device the selected message item;

adding non-selected contact to a persistent blacklist; and rejecting further incoming message items with a contact corresponding to a contact on the persistent blacklist.

2. The computer-implemented method of claim 1, further comprising, at a selected time, deleting from the temporary blacklist buffer any message items corresponding to a contact not selected by the user for transfer to the whitelist.

3. The computer-implemented method of claim 1, further comprising, at a selected time, deleting from the temporary blacklist buffer any message items corresponding to a contact selected for deletion from the contacts blacklist.

4. The computer-implemented method of claim 1, wherein the summary information is pushed to the mobile communications device by the host system and wherein the blacklist/whitelist client module on the mobile communication device is operable to detect a selection of two or more messages from the summary and, after selection of the two or more messages, to transmit a communication to the host system identifying the two or more messages.

5. The computer-implemented method of claim 1, further comprising:
   receiving at the blacklist/whitelist client module on the mobile communication device, an identification of contacts stored in the contacts blacklist; and
   receiving selection to transfer one of the contacts from the contacts blacklist to the whitelist.

6. A computer-implemented method as defined in claim 1, wherein the blacklist/whitelist client module detects selection of a second selected message item from the summary information and the blacklist/whitelist client module is to send an identification of the contact of the selected message item and a second contact of the second selected message item to the host system using a single communication.

7. A mobile communications device comprising:
   (a) a main processor that controls the operation of the mobile communications device;
   (b) a communication subsystem connected to the main processor, the communication subsystem configured to send data to and receive data from a host system;
   (c) a blacklist/whitelist client module executable by the main processor for managing messages directed to the communications device by:
      receiving from the host system a pushed list of summary information corresponding to blacklist message items received from contacts in a blacklist, wherein contacts of the blacklist message items are added to a blacklist at the host system when the contacts are not found on a whitelist at the host system and the blacklist message items are added to a temporary blacklist buffer at the host system;
      providing with a display of the summary information pushed from the host system, for a blacklist message item, an action field to enable selection of a contact for transfer from the blacklist to the whitelist;
      receiving a selection of two or more contacts;
      determining that the two or more contacts should be moved to the whitelist at the host system; and
      sending one communication indicating that the two or more contacts should be moved to the whitelist, wherein the host system transmits message items corresponding to the two or more contacts to the mobile communications device in response to the communication and the host system adds non-selected contacts to a persistent blacklist and rejects further incoming messages items with the non-selected contacts on the persistent blacklist.

8. The communications device of claim 7, wherein the action field comprises an action field associated with each message item summary, the action field being selectable.

9. The communications device of claim 8, wherein the action field provides a visual indication of selection.

10. The communications device of claim 7, wherein the action field comprises an action field associated with the message item summary, the action field having a plurality of selectable options.

11. The communications device of claim 10, wherein the plurality of selectable options includes selection of a contact for transfer to the whitelist, deletion of a contact from the blacklist, and maintaining a contact on the blacklist pending further review.

12. A system comprising:
   a mobile communications device comprising:
      code to receive from a blacklist/whitelist server module of a host system, at a blacklist/whitelist client module on the mobile communications device, summary information corresponding to message items received from contacts not found on a whitelist at the blacklist/whitelist server module of the host system, wherein the blacklist/whitelist client module on the mobile communications device is to detect selection of a message item from the summary information and to determine at the blacklist/whitelist client module that a contact of the selected message item should be moved to the whitelist at the host system; and
      code to send to the host system an identification of the contact to transfer to the whitelist; and
   a host system comprising:
      code to compare, at the blacklist/whitelist server module of the host system, the message item to the whitelist;
      code to add the contact for the message item to a blacklist when the contact is not found on the whitelist;
      code to forward to the blacklist/whitelist client module on the mobile communications device, summary information corresponding to the message items received from the contacts in the blacklist;
      code to receive, at the host system from the blacklist/whitelist client module on the mobile communications device, the selection of the message item and to transfer the contact of the selected message item from the blacklist to the whitelist;
      code to, after adding the contact to the contacts blacklist, store in a temporary blacklist buffer message items corresponding to the contact added to the blacklist;
      code to, after receiving the selection of the selected contact to transfer from the contacts blacklist to the whitelist, transmit to the mobile communications device message items corresponding to contacts on the whitelist;
      code to add a non-selected contact to a persistent blacklist; and
      code to reject further incoming message items with a contact corresponding to a contact on the persistent blacklist.

13. The system of claim 12, wherein the host system further includes code to delete from the temporary blacklist buffer, message items corresponding to a contact not selected for transfer to the whitelist.

14. The system of claim 12, wherein the host system further includes code to delete from the temporary blacklist buffer, message items corresponding to a contact selected for deletion from the blacklist.

15. The system of claim 12, wherein the host system further includes: code to automatically add the contact for the incoming message to a whitelist based on a predetermined criteria.

\* \* \* \* \*